Oct. 31, 1961     W. M. OSBORN     3,006,364
ADJUSTABLE BY-PASS VALVE AND ACCUMULATOR
Filed Oct. 1, 1959
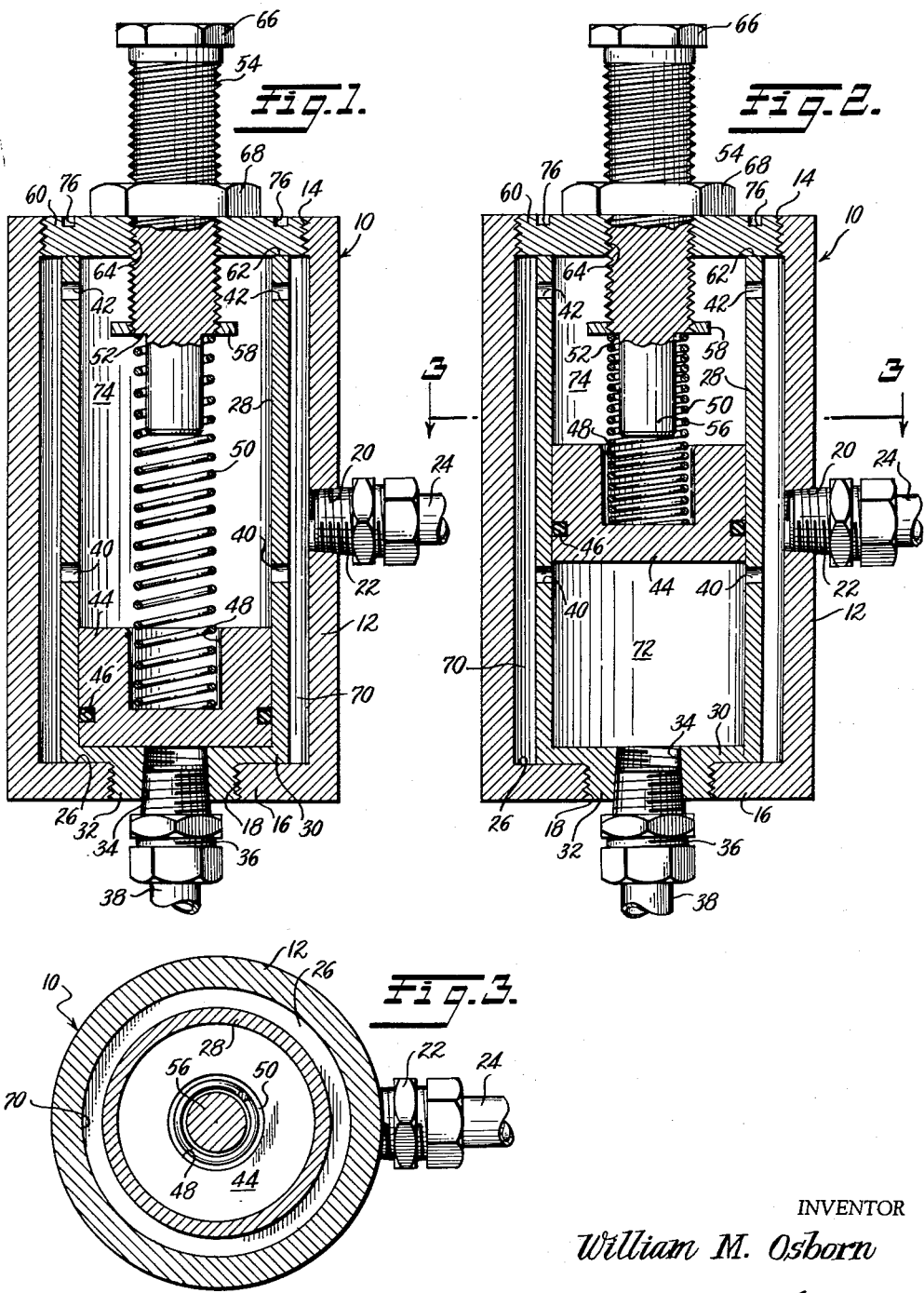
INVENTOR
William M. Osborn
BY Bacon & Thomas
ATTORNEYS

3,006,364
ADJUSTABLE BY-PASS VALVE AND ACCUMULATOR
William M. Osborn, 3349 Zuni St., Denver, Colo.
Filed Oct. 1, 1959, Ser. No. 843,670
8 Claims. (Cl. 137—533)

This invention relates to a by-pass valve, and more specifically to a novel adjustable by-pass valve capable of use on the discharge side of a pump to serve as an excess pressure by-pass and as an accumulator to remove the pulses resulting from the intermittent discharge of a reciprocating piston type pump.

It is an object of this invention to provide a novel by-pass valve which provides a large chamber functioning as an accumulator to smooth out pressure impulses, and which is adjustable to relieve any desired excess pressure.

It is a further object of the invention to provide a novel by-pass valve which is made from a minimum number of parts, which can be easily manufactured by economical processes, which can be assembled by unskilled workmen, and which admirably serves as an accumulator and a pressure relief means.

It is a still further object of the invention to provide a novel by-pass valve and accumulator, which is simple in construction, which is reliable in operation, and which can be economically manufactured and assembled.

With the foregoing and other objects in view which will appear in the following specification, the invention resides in the novel combination and arrangement of parts and/or the details of construction hereinafter described and claimed, and illustrated in the accompanying drawing, in which:

FIG. 1 is a vertical sectional view through the valve, showing the parts in their unloaded position;

FIG. 2 is a view, similar to FIG. 1, showing the parts in their pressure relieving or by-passing position in which the piston valve uncovers the by-pass ports; and FIG. 3 is a transverse sectional view through the by-pass valve taken on the line 3—3 of FIG. 2.

Referring to the drawings, the adjustable by-pass valve and accumulator is designated in its entirety by the reference numeral 10, and comprises an elongated outer tubular member 12, having a threaded open end 14, the other end being closed by an end wall 16 having a central threaded bore 18 therethrough. The side wall of the tubular member 12 is provided with a threaded bore 20 adapted to receive a pipe nipple 22 to which is connected a by-pass or discharge conduit 24. The inner surface 26 of the end wall 16 is finished smoothly to form a close fit with the outer surface of the end wall of an inner tubular member, as will be described hereinafter.

An inner tubular member 28, adapted to be received within the outer tubular member 12, comprises a cylinder having an upper open end, the lower end being closed by an end wall 30 provided with an axially extending boss 32 having an external diameter equal to the internal diameter of the threaded bore 18. Boss 32 is provided with external threads which matingly engage the threads of the bore 18, whereby the inner tubular member 28 may be firmly secured within the outer tubular member, in which the smooth outer surface of the end wall 30 of the inner tubular member lies against the smooth inner surface 26 of the end wall 16 of the outer tubular member. A threaded bore 34 extends axially through the end wall 30 and boss 32, which is adapted to receive a pipe nipple 36 for an inlet conduit 38.

A plurality of apertures 40 are provided in the wall of the tubular member 28, spaced a short distance from the closed end thereof, forming pressure relief openings, as will appear hereinafter. A plurality of apertures 42 are provided adjacent the open end of the tubular element 28 permitting communication between the interior of the tubular element and an annular chamber 70 formed between the tubular elements 12 and 28. A piston 44 is slidable within the tubular element 28 and forms a valve member to control the flow of fluid through the apertures 40 when the piston is moved to the position shown in FIG. 2. Piston valve 44 has an annular recess in a peripheral wall to receive a neoprene seal 46, and a recess 48 in an upper wall to receive one end of a compression spring 50 tending to urge the piston valve toward the end wall 30, as shown in FIG. 1. The other end of the spring abuts a shoulder 52 on a threaded stem 54 having a reduced diameter end extension 56 within the coils of the spring to form a guide member for the spring and a stop member to limit the upward travel of the piston valve. A collar 58 is threaded on the lower end of the threaded stem 54 to cooperate with the shoulder 52 to form an abutment for the upper end of the spring 50, and to limit the upward movement of the threaded stem.

A disk 60 forms a closure member for the open ends of the tubular members 12 and 28. Disk 60 is provided with threads on its periphery adapted to engage the threads on the open upper end 14 of the outer tubular member 12 and to engage the upper edge 62 of the open end of the tubular member 28, which latter tubular member has a shorter axial length than the outer tubular member 12, as shown. The disk 60 is provided with a central threaded bore 64 to matingly engage the external threads on the stem 54. The outer end of the stem has a hexagonal head 66 adapted to receive a wrench. A lock nut 68 on the stem 54 engages the upper surface of the disk 60 to retain the stem in adjusted position. The upper surface of the disk 60 is provided with a plurality of recesses 76 for receiving a spanner wrench.

The piston valve 44 divides the interior of the inner tubular member 28 into a lower expansion or accumulator chamber 72, and an upper back pressure chamber 74 connected by way of the apertures 42, annular chamber 70 and conduit 24 to a point of low pressure, such as the ambient atmosphere or to a pump inlet.

If used as a by-pass and accumulator for a pump, the conduit 38 is connected to the discharge side of the pump, and the conduit 24 is connected to the inlet side of the pump. In pumps of the reciprocating type, the pump discharges the liquid at high pressure intermittently on each exhaust stroke of the piston or pistons, producing a pulsating or fluctuating pressure in the discharge side of the pump. Some of the liquid will be pumped into the expansion chamber 72 below the piston valve 44, which piston valve can move upwardly against the force of the spring 50 on each discharge stroke of the pump piston, thus relieving the conduit system of the shock that would otherwise occur. The accumulator effect of the chamber 72 tends to maintain a constant pressure in the line to which the pump discharges and to also maintain a reserve supply over and above that permitted in the conduits. Because of the location of the apertures 40 relative to the end wall 30 the piston valve 44 must move a long distance before it uncovers the apertures as shown in FIG. 2. The upper surface of the piston valve is subject to the fluid pressure in the chamber 74 and the conduit 24, i.e., the pump inlet pressure, and the lower surface of the piston valve is subject to the pump discharge pressure present in chamber 72. As the areas of the upper and lower surfaces of the piston valve are equal, the fluid pressures acting on the piston valve represent the differential pressure across the pump or the pressure rise.

The device is assembled by inserting the closed end of the inner tubular member 28 into the outer tubular member 12, and screwing the threaded boss 32 into the threaded bore 18 until the outer surface of the end wall 30 engages the inner surface of the end wall 16. A tool can be inserted in the apertures 42 or 40 to facilitate screwing. Piston valve 44 may then be lifted within the inner tubular member 28, and the coil spring 50 placed in the recess 48. Lock nut 68 is threaded on the stem 54 well past the midpoint, and the stem threaded through the threaded bore 64 of the closure member 60, whereupon the collar 58 may be threaded to the lower threaded end of the stem as shown. The closure member 60 is then brought into position over the tubular members 12 and 28, and the extension 56 is inserted within the coils of the spring 50, whereupon the closure member may be screwed into the threaded upper end 14 of the outer tubular member 12 until the lower surface of the closure member engages the upper edge 62 of the inner tubular member 28. A spanner wrench, engaging the recesses 76 in the closure member, can be employed to screw the closure member tightly against the upper edge of the inner tubular member, thereby retaining the parts in tightly assembled relation.

From the foregoing, it is seen that only one seal is required, viz., the sealing ring 46 on the piston valve. It is not essential that close machined fits be provided, as the chamber 72 is the only part under high pressure. The upper edge 62 of the tubular member 28 need not have a fluid tight seal with the closure member, as the pressures in the chambers 74 and 70 are the same. As a matter of fact, the orifices 42 connecting these latter chambers can be provided by means of slots in the upper edge of the inner tubular member 28 if desired.

In operation, the pumping action of the pump, not shown, will cause some of the fluid under pressure to enter the conduit 38 and the expansion chamber 72 below the piston valve 44, causing the piston valve to move away from the closed end wall 30, thereby absorbing the pressure fluctuations on the discharge side of the pump and forming an accumulator to maintain a constant supply of liquid under pressure. As mentioned above, the back pressure chamber 74 above the piston valve 44 is exposed to the inlet pressure of the pump acting through the conduit 24, annular chamber 70 and apertures 42. This back pressure, accompanied by the compressive force of spring 50, tends to urge the piston valve 44 downward in opposition to the discharge pressure of the pump present in the expansion chamber 72. In the event of an excess discharge pressure, the piston valve 44 will be raised until the lower end thereof uncovers the apertures 40, whereby a part of the high pressure liquid will be bypassed to the low pressure side of the pump by way of the apertures 40, annular chamber 70 and conduit 24, thereby relieving the pressure in the discharge conduit from the pump, not shown. In this way, the device functions to maintain a maximum pressure differential across the pump.

The pressure differential which the device can maintain is capable of adjustment by means of the threaded stem 54. If it is desired to increase the pressure differential across the pump, the lock nut 68 is loosened and the threaded stem 54 is screwed inwardly by means of a wrench engaging the hexagonal head 66, thereby increasing the compressive force on the spring 50. When the desired compression has been attained, the threaded stem 54 is locked by tightening the lock nut 68. Decreasing the compressive force of the spring 50, by turning the threaded stem 54 in the opposite direction, is effective to decrease the pressure differential that the device maintains across the pump.

The device can also be used as a pressure relief valve or as a pressure regulator in a fluid line under pressure by connecting the conduit 38 to said line and discharging the conduit 24 to the atmosphere or to some other desired point of discharge. In such an arrangement, atmospheric pressure would be present in the chamber 74, and the device would maintain a definite gage pressure in the line to which the conduit 38 is connected.

The apertures 42, in addition to their function of connecting the back pressure chamber 74 to the discharge conduit 42, provide leak ports for the escape of any fluid that may seep past the piston valve 44 into the chamber 74, to prevent such fluid from blocking the piston valve 44.

As mentioned above, the extension 56 on the threaded stem 54 serves as a guide means for the spring 50, to prevent twisting and distortion thereof, and the lower end of the extension serves as an abutment to limit the upward movement of the piston valve 44.

Having fully described my invention, it is to be understood that I do not wish to be limited to the exact details herein set forth, but that my invetnion is of the full scope of the appended claims.

I claim:
1. An adjustable by-pass valve and accumulator comprising: an outer tubular member having a smooth cylindrical inner wall, an open end and a closed end having a bore therethrough; an inner tubular member having an external smooth cylindrical wall having a diameter which is less than the internal diameter of the inner wall of said outer member and receivable within said outer member to define a central cylindrical chamber and an annular chamber, of uniform internal and external diameters extending the length of said inner tubular member, said central cylindrical chamber having an open end and a closed end; an axial boss on the closed end of said inner tubular member having an external diameter equal to the internal diameter of the bore in the closed end of the outer tubular member and adapted to be received therein; an axial bore in the closed end and boss of said inner tubular member providing a flow passage; apertures in the wall of said inner tubular member spaced from the closed end thereof; a piston valve reciprocable within said inner tubular member and adapted to cover and uncover said apertures; resilient means acting on said valve to urge the valve toward said closed end to cover said apertures; an aperture in the wall of said outer tubular member providing a flow passage; and common closure means to close the open ends of the inner tubular member and annular chamber.

2. An adjustable by-pass valve and accumulator according to claim 1, in which the boss on the inner tubular member threadedly engages the bore in the closed end of the outer tubular member.

3. An adjustable by-pass valve and accumulator according to claim 1, in which the inner tubular member has a shorter axial length than the outer tubular member, and in which said closure means comprises a closure member engaging the inner wall of the outer tubular member and the edge of the open end of the inner tubular member.

4. An adjustable by-pass valve and accumulator according to claim 3, in which said closure member engages the inner wall of the outer tubular member by means of a threaded connection.

5. An adjustable by-pass valve and accumulator according to claim 1, including means carried by said closure means to adjust the force of said resilient means.

6. An adjustable by-pass valve and accumulator according to claim 5, in which said adjustable means comprises a threaded stem engaging one end of said resilient means, and a threaded bore in said closure means matingly engaging the threaded stem.

7. An adjustable by-pass valve and accumulator according to claim 1, including other openings in the wall of the inner tubular member, beyond the limit of movement of the piston valve, to connect the interior of the inner tubular member to the annular chamber provided between the inner and outer tubular members.

8. An adjustable by-pass valve and accumulator according to claim 1, in which the axial bore in the closed end and boss of the inner tubular member is threaded to receive a pipe fitting.

References Cited in the file of this patent
UNITED STATES PATENTS

| | | |
|---|---|---|
| 1,292,613 | Kessler | Jan. 28, 1919 |
| 1,502,739 | Munizinger | July 29, 1924 |
| 2,305,519 | Dunmire | Dec. 15, 1942 |
| 2,591,528 | Filstrup | Apr. 1, 1952 |
| 2,826,216 | Thomas | Mar. 11, 1958 |